Figure 1:
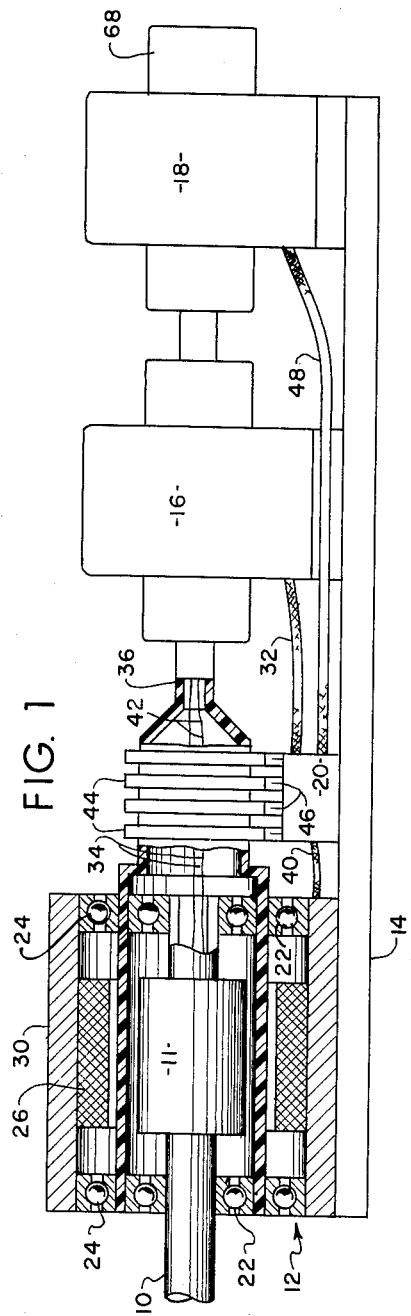

Aug. 17, 1965   H. E. HOLLMANN   3,201,669
SERVO TYPE INTEGRATOR WITH MEANS FOR
MINIMIZING THE EFFECTS OF FRICTION
Original Filed April 8, 1960

INVENTOR.
HANS E. HOLLMANN
BY
ATTORNEY

United States Patent Office 3,201,669
Patented Aug. 17, 1965

3,201,669
SERVO TYPE INTEGRATOR WITH MEANS FOR MINIMIZING THE EFFECTS OF FRICTION
Hans E. Hollmann, Studio City, Calif., assignor to Dresser Industries, Inc., Dallas, Tex., a corporation of Delaware
Original application Apr. 8, 1960, Ser. No. 22,077. Divided and this application Dec. 17, 1962, Ser. No. 252,542
3 Claims. (Cl. 318—30)

This application is a division of co-pending application Serial No. 22,077, filed April 8, 1960, which application is a continuation-in-part of application Serial No. 789,342, filed January 27, 1959, now abandoned.

This invention relates to means for reducing the effect of a bearing friction to a negligible value, and more particularly to devices utilizing a mechanical movement where friction is undesirable such as integrators of the inertia type which incorporate rotors mounted in bearings to which a torque is applied in proportion to a signal to be integrated, and such as D'Arsonval type microammeters.

Inertia type integrators of the prior art rely on the physical laws that angular acceleration is proportional to applied torque in accordance with the moment of inertia of the rotor about its axis, angular velocity is proportional to the integral of angular acceleration, and angular displacement is proportional to the integral of angular velocity or proportional to the double integral of angular acceleration. However, these integrators suffer from a serious error, which, to the present time, has not been dealt with except by the use of low friction bearings to support the rotor assembly. This error is, in fact, due to bearing friction because bearing friction always subtracts from the applied torque regardless of the direction in which it is applied.

The present invention overcomes the above-described and other disadvantages of the prior art by providing support means, first means movably carried on the support means, second means movably carried on the first means, third means to detect movement of the second means, and fourth means responsive to the output of the third means for moving the first means in a direction tending to reduce relative movement between the first and second means. All of the means may take any one of several forms. For example, an integrator may be constructed having fixed support means, a Selsyn receiver having a stator including a winding fixed to the support means and a hollow rotor with a winding thereon, outer bearing means between the fixed support means and the Selsyn receiver rotor, a Selsyn transmitter having a stator including a winding and a rotor with a winding thereon, inner bearing means inside the hollow rotor between the hollow rotor and the Selsyn transmitter rotor.

The invention will be better understood when considered in connection with the following description.

Figure 2:
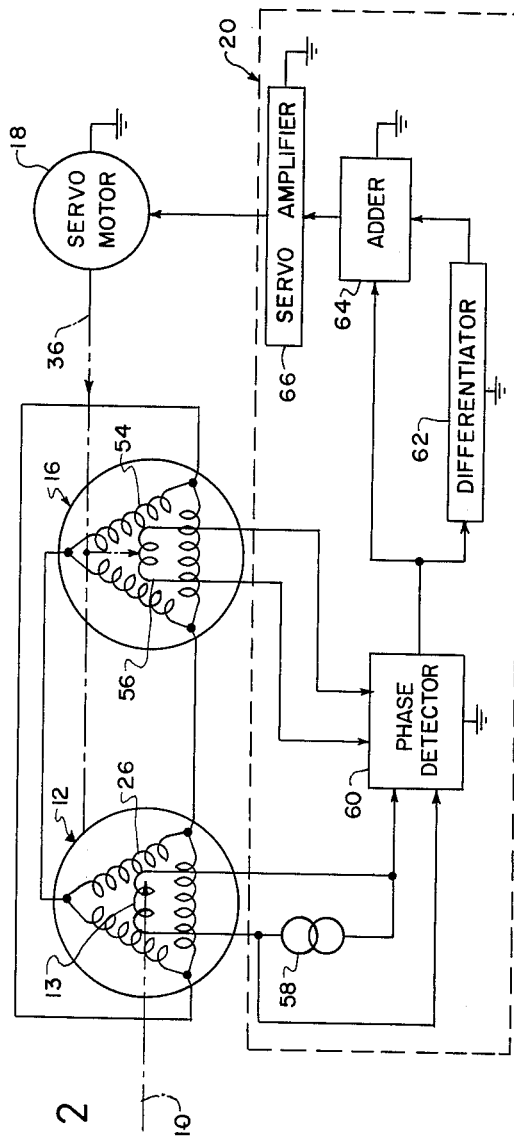

In the accompanying drawings, which are to be regarded as merely illustrative:

FIG. 1 is a broken away side elevational view of an integrator made in accordance with the invention; and FIG. 2 is a schematic diagram of the apparatus shown in FIG. 1.

An integrator is shown in FIG. 1 having an input shaft 10 connected to a rotor element 11 of a Selsyn transmitter 12. All the structure employed in the embodiment shown in FIG. 1 is mounted on a table 14. Besides Selsyn transmitter 12, a Selsyn receiver 16 is also employed with a servo motor 18 and a control circuit housing 20. Input shaft 10 is rotatably mounted in bearings 22 in a hollow non-magnetic, e.g. copper or dielectric, rotor shaft 36 of Selsyn receiver 16. Rotor shaft 36 is, in turn, mounted in bearings 24 in a housing 30 of Selsyn transmitter 12 which is fixed to table 14. Selsyn transmitter 12 incorporates both the element 11 having a rotor winding 13 and a stator winding 26, the latter of which is fixed to housing 30. Stator winding 26 of Selsyn transmitter 12 has output leads in a cable 40 connected with those of Selsyn receiver 16 in a cable 32 in housing 20. The rotor winding 13 of Selsyn transmitter 12 has output leads as indicated at 34. Input shaft 10 is hollow at its right end to provide a space for Selsyn transmitter rotor winding output leads 34. Selsyn receiver 16 has a rotor winding, not shown, fixed to shaft 36 and having output leads 42. The four leads 34 and 42 are connected to four corresponding slip rings 44 which are engaged by brushes 46 mechanically fixed to control circuit housing 20. It is to be understood that if a special grounding connection is used for several of the leads, the number of slip rings 44 and corresponding brushes 46 may be reduced to as few as one. The control circuit of housing 20 then controls rotation of the rotor of motor 18 which is fixed to shaft 36. The control circuit in housing 20 is connected to motor 18 via an electrical cable 48.

The operation of the embodiment of the invention shown in FIG. 1 will be better understood when considered in connection with the schematic diagram of FIG. 2. Selsyn transmitter stator winding is indicated at 26 and the rotor winding thereof is indicated at 13. Similarly, the Selsyn receiver stator winding is indicated at 54 and the rotor winding thereof is indicated at 56. The control circuit of housing 20 includes a source of alternating voltage 58 which is employed to energize Selsyn transmitter rotor winding 13 and to supply a reference voltage to a phase detector 60. Upon energization of Selsyn transmitter rotor winding 13, the Selsyn transmitter stator winding 24 is thereby energized. Selsyn transmitter stator winding 26 is then connected to Selsyn receiver winding 54 to induce a voltage in Selsyn receiver rotor winding 56. Rotor winding 56 is then connected to phase detector 60. The output of the synchro transformer 16 is a conventional suppressed carrier modulated signal and the output of the detector is proportional to the amplitude of the envelope with its polarity reversing when the phase within the envelope reverses. Phase detector 60 discriminates between the output signal of one phase or a signal 180° out of phase therewith and the D.C. output of the phase detector 60 is directly proportional to the cosine of the difference between the position of the two rotor shafts 10 and 36. Phase detector 60 may, in fact, be of the type described and illustrated in U.S. Patent No. 2,806,175 or simply an analog subtractor. The output of phase detector 60 is then impressed upon an analog differentiator 62 and an analog adder 64 which adds the output of phase detector 64 with the output of differentiator 62. The output of adder 64 is then employed to drive servo motor 18 through a servo amplifier 66. Analog subtractors, adders, and differentiators are, of course, old in the art and may be of any suitable type. Some are illustrated on page 11 of the book Electronic Analog Computers, by Korn and Korn (McGraw-Hill, 1952).

In view of the fact that input shaft 10 is rotatable with respect to shaft 36, it may not be obvious why the Selsyn transmitter rotor output leads 34 will not become entangled. This is true because, in accordance with the invention, shaft 36 is driven at exactly the same average rate of speed as rotor 10. Further, if the gain of servo amplifier 66 is sufficiently high, very little angular displacement of input shaft 10 will ever result with respect to shaft 36.

The manner in which the embodiment of the invention shown in FIGS. 1 and 2 operates as an integrator is as follows. Shaft 10 will rotate an angular acceleration proportional to its input torque. Hence, its angular velocity will be proportional to the integral of the input torque and its angular displacement will be proportional to the integral of its angular velocity or double integral of its input torque. Bearing friction is completely overcome for all practical purposes by the present invention because by the servo system which is employed, shaft 36 rotates at the same rate of speed as shaft 10. Hence, rotor 10 does not rotate substantially with respect to shaft 36 and therefore with respect to bearings 22 so that friction is not involved. As a matter of fact, if sufficient damping is employed, shaft 10 may not rotate in any manner whatsoever within bearings 22. Thus, by the servo system of the invention, shaft 36 is driven exactly at the same rate of speed as shaft 10 and the angular acceleration of either will be proportional to input torque etc. Detector means 68 in FIG. 1, which may be a tachometer generator, may be employed to produce an electrical output signal proportional to the angular velocity or displacement of shaft 36.

As can be seen in FIG. 2, phase detector 60 detects any relative angular movement of input shaft 10 with respect to shaft 36 and servo motor 18 is driven accordingly. Phase detector 60 may produce a direct-current voltage of a positive or of a negative polarity depending upon the direction of relative angular movement of input shaft 10 with respect to shaft 36. Differentiator 62 need not necessarily be employed although damping is provided by it to prevent oscillation of the angular velocity of shaft 36 relative to the angular velocity of shaft 10.

From the foregoing, it will be apparent that all friction loss will be due to a lack of damping, if none is provided, between a shaft rotatable in or on another shaft rotatable with respect to a fixed support. This is true because when the outer rotary means is "slaved" to the inner rotary means in accordance with the present invention, little or no movement takes place of the inner rotary means on the outer rotary means and bearing friction is therefore no longer a problem.

Although a specific embodiment of the invention has been shown and described, it is to be understood that many changes and modifications thereof will, of course, suggest themselves to those skilled in the art. The invention is therefore not to be limited to the embodiment illustrated, the true scope thereof being defined only in the appended claims.

What is claimed is:
1. An integrator comprising: fixed support means; a Selsyn receiver having a stator including a winding fixed to said support means and a rotor including a winding rotatably carried on said support means; a Selsyn transmitter having a stator including a winding fixed to said support means and a rotor including a winding rotatably supported from said Selsyn receiver rotor; means to apply an alternating voltage to said Selsyn transmitter rotor winding; means to connect said stator windings electrically; means for producing an error signal proportional to the difference between the amplitudes of said applied voltage and the voltage induced in said Selsyn receiver rotor winding; and means responsive to said error signal for rotating said Selsyn receiver rotor in a direction tending to reduce said error signal to zero.

2. An integrator comprising: fixed support means; a Selsyn receiver having a stator including a winding fixed to said support means and a rotor including a winding rotatably carried on said support means; a Selsyn transmitter having a stator including a winding fixed to said support means and a rotor including a winding rotatably supported from said Selsyn receiver rotor; means to apply an alternating voltage to said Selsyn transmitter rotor winding; means to connect said stator windings electrically; means including a phase detector for producing an error signal proportion to the difference between said applied voltage and the voltage induced in said Selsyn receiver rotor winding; and a servo motor responsive to said error signal for rotating said Selsyn receiver rotor in a direction tending to reduce said error signal to zero.

3. The invention as defined in claim 2, wherein said means including a phase detector also includes means for producing an error signal proportional to the sum of the output of said phase detector and the rate of change of the output of said phase detector.

References Cited by the Examiner
UNITED STATES PATENTS

| | | | |
|---|---|---|---|
| 2,355,921 | 8/44 | Mercier et al. | 73—187 |
| 2,983,556 | 5/61 | Coan | 308—183 |
| 2,987,662 | 6/61 | Jamieson | 318—30 X |

JOHN F. COUCH, *Primary Examiner*.
JOSEPH B. STRIZAK, *Examiner*.